H. T. MOLER.
FASTENING DEVICE FOR EAR ORNAMENTS.
APPLICATION FILED JULY 19, 1919.
1,344,556.
Patented June 22, 1920.
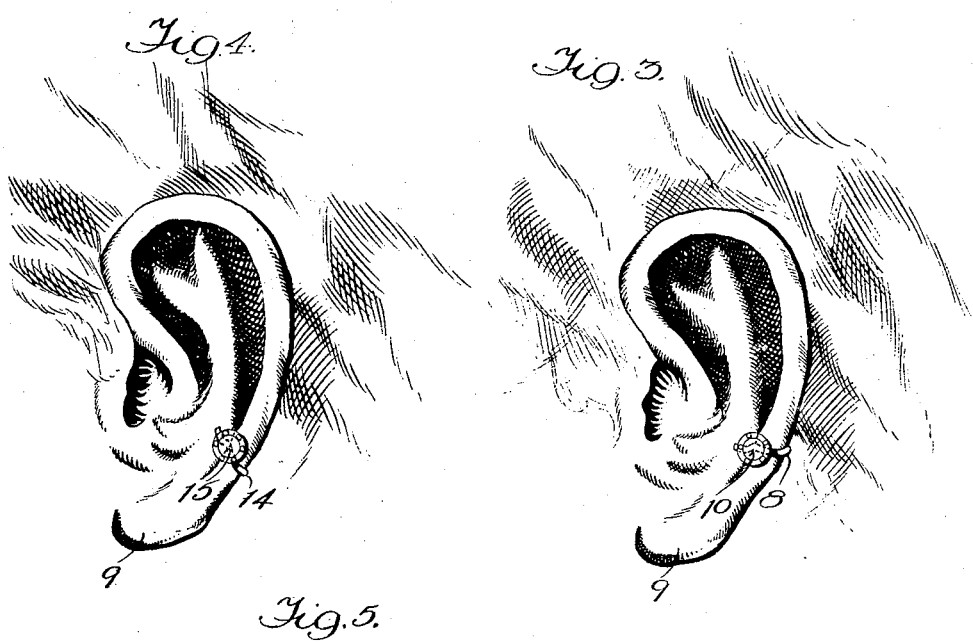
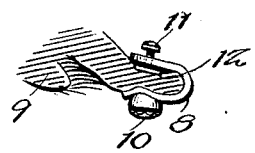
WITNESSES
Inventor
H. T. MOLER,
By
Attorney

UNITED STATES PATENT OFFICE.

HARVEY TANNER MOLER, OF PHILADELPHIA, PENNSYLVANIA.

FASTENING DEVICE FOR EAR ORNAMENTS.

1,344,556. Specification of Letters Patent. Patented June 22, 1920.

Application filed July 19, 1919. Serial No. 311,917.

*To all whom it may concern:*

Be it known that I, HARVEY T. MOLER, a citizen of the United States, and a resident of Philadelphia, in the county of Philadelphia, State of Pennsylvania, have invented certain new and useful Improvements in Fastening Devices for Ear Ornaments, of which the following is a specification.

My invention is an improvement in fasteners for ear ornaments, and has for its object to provide a simple and efficient fastener of the character specified, for firmly securing an ornament in place on the ear in such manner that it will cause no inconvenience; may be easily detached when desired, and will follow the natural curve of the ear.

In the drawings,

Figure 1, is a front view of one embodiment of the invention, in place;

Fig. 2, is a top plan view of the ornament, with the ear in section;

Figs. 3 and 4, are front views showing other modifications;

Fig. 5, is a top plan view of the construction of Fig. 3, with the ear in section.

In the embodiment of the invention shown in Figs. 1 and 2, the fastener comprises a substantially U shaped member or yoke, of double formation, composed of similar sections 1 and 2, each comprising a body and arms, the bodies being spaced apart and the arms of the sections connected at the ends remote from the body.

Thus looked at in front or rear a substantially Y shaped appearance is presented by the fastener, and at their connection the arms of the two sections of the yoke are firmly and rigidly secured together, and on one of the connections an ornament 3 is supported, as for instance, a jewel.

The jewel is held in a suitable setting, and referring to Fig. 1, it will be noticed that the arm of the yoke to which the setting is connected, has on its inner face a rounded lug or projection 4 which fits within the natural furrow at the joint of the ear 5.

A set screw 6 is threaded through the other connection of the section arms, and this set screw has a bearing plate 7 on the inner end which engages the rear surface of the ear as shown, to firmly clamp the fastener in place.

The yoke is of such size that when the projection 4 is engaged with the furrow of the ear, the bodies of the yoke sections will fit smoothly against and around the rounded edge of the ear, as clearly shown in Figs. 1 and 2, and it will be noticed that the bearing plate 7 is large enough to provide sufficient bearing to prevent inconvenience.

In Figs. 3, 4 and 5, the fastener comprises a substantially U shaped member or yoke 8, shaped like the double yoke 1—2 of Fig. 1, and comprising a body fitting smoothly about the edge of the ear 9, and arms engaging the opposite surfaces of the ear.

One of the arms of the yoke carries an ornament 10, and a set screw 11, is threaded through the other. The set screw carries a bearing plate 12, and the first named arm has an inwardly offset portion 13, which fits within the natural groove or furrow near the edge of the ear, and corresponds in position and function to the projection 4 of Fig. 2.

The construction shown in Fig. 4 is the same as that shown in Fig. 3, except that the arms of the yoke 14 are a little longer than those of the yoke 8, and when the fastener is placed, the body will drop slightly below the level of the ornament 15, contacting with the edge of the ear, and with the arms of the yoke extending upwardly at an angle of approximately 30 degrees to the horizontal.

In either case, the fastener gives a safe, secure, and painless hold, and is inconspicuous, lying as it does close to the ear. The fastener in its simplest form, is a rod or wire of suitable gage and material bent to conform with the shape of the ear at the edge, front and rear, and having means for holding it in place.

A rod or bar of any cross section may be used, preferably circular so that there will be no sharp edges to cause irritation. The construction of Fig. 1 provides a better support against sagging down, and against the tendency of the ornament as a whole to slip down.

I claim:

An ear ornament mounting comprising a U-shaped yoke disposed in straddling engagement upon the rear free edge of the ear above the lobe thereof, a knob carried by the outer arm of the yoke and having a convex face adapted for engagement within a furrow adjacent the outer edge of the ear, a flat leaf disposed inwardly of the other arm of the yoke and engaging against the side of the ear toward the head, and a screw threaded through the inner arm of the yoke and engaging said leaf.

HARVEY TANNER MOLER.